United States Patent
Ebihara et al.

(10) Patent No.: US 11,519,924 B2
(45) Date of Patent: Dec. 6, 2022

(54) AUTOMATIC ANALYSIS DEVICE

(71) Applicant: Hitachi High-Technologies Corporation, Tokyo (JP)

(72) Inventors: Daisuke Ebihara, Tokyo (JP); Kenta Imai, Tokyo (JP); Yoshihiro Yamashita, Tokyo (JP); Shigeki Matsubara, Tokyo (JP); Taku Sakazume, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 954 days.

(21) Appl. No.: 16/329,021

(22) PCT Filed: Aug. 4, 2017

(86) PCT No.: PCT/JP2017/028353
§ 371 (c)(1),
(2) Date: Feb. 27, 2019

(87) PCT Pub. No.: WO2018/047544
PCT Pub. Date: Mar. 15, 2018

(65) Prior Publication Data
US 2019/0204346 A1    Jul. 4, 2019

(30) Foreign Application Priority Data

Sep. 8, 2016 (JP) .............................. JP2016-175178

(51) Int. Cl.
*G01N 35/00* (2006.01)
(52) U.S. Cl.
CPC ....... *G01N 35/00623* (2013.01); *G01N 35/00* (2013.01); *G01N 35/00871* (2013.01); *G01N 2035/00891* (2013.01)

(58) Field of Classification Search
CPC ..... G01N 35/00871; G01N 2035/0091; G01N 35/00722; G01N 2035/00277;
(Continued)

(56) References Cited

U.S. PATENT DOCUMENTS 5,259,812 A    11/1993 Kleinsek
10,211,471 B2 *  2/2019 Shim ................. H01M 8/04201
(Continued)

FOREIGN PATENT DOCUMENTS

JP       2867619 A    3/1999
JP    2009-30987 A    2/2009
(Continued)

OTHER PUBLICATIONS

International Search Report (PCT/ISA/210) issued in PCT Application No. PCT/JP2017/028353 dated Oct. 17, 2017 with English translation (three (3) pages).
(Continued)

*Primary Examiner* — Shogo Sasaki
(74) *Attorney, Agent, or Firm* — Crowell & Moring LLP

(57) ABSTRACT

In order to aspire to higher sensitivity in an automatic analysis device, it is important to prevent the mixing of dust and the like in a reaction part in which a sample and a reagent react. The present invention presents an automatic analysis device that is provided with a configuration for making the pressure inside a specific block in the device such as a reaction part, or inside the device become positive. By making the pressure become positive and forming an air flow that flows out from the inside of the reaction part or the device, it is possible to limit, to a certain amount or less, the amount of dust penetrating into the reaction part.

16 Claims, 8 Drawing Sheets

(58) Field of Classification Search
CPC ....... G01N 35/00613; G01N 35/00623; G01N 2035/00306; G01N 2035/009; G01N 2035/00891; G01N 35/00; B01L 2200/141; B01L 1/04
See application file for complete search history.

(56) References Cited

U.S. PATENT DOCUMENTS

2009/0298129 A1* 12/2009 Spence ............ G01N 35/00732
901/30
2012/0058900 A1* 3/2012 Gisler ................ G01N 35/0099
506/7

FOREIGN PATENT DOCUMENTS

JP 2011-127916 A 6/2011
WO WO 2017/221155 A1 12/2017

OTHER PUBLICATIONS

Japanese-language Written Opinion (PCT/ISA/237) issued in PCT Application No. PCT/JP2017/028353 dated Oct. 10, 2017 (three (3) pages).
Extended European Search Report issued in European Application No. 17848488.7 dated Mar. 18, 2020 (eight (8) pages).

* cited by examiner

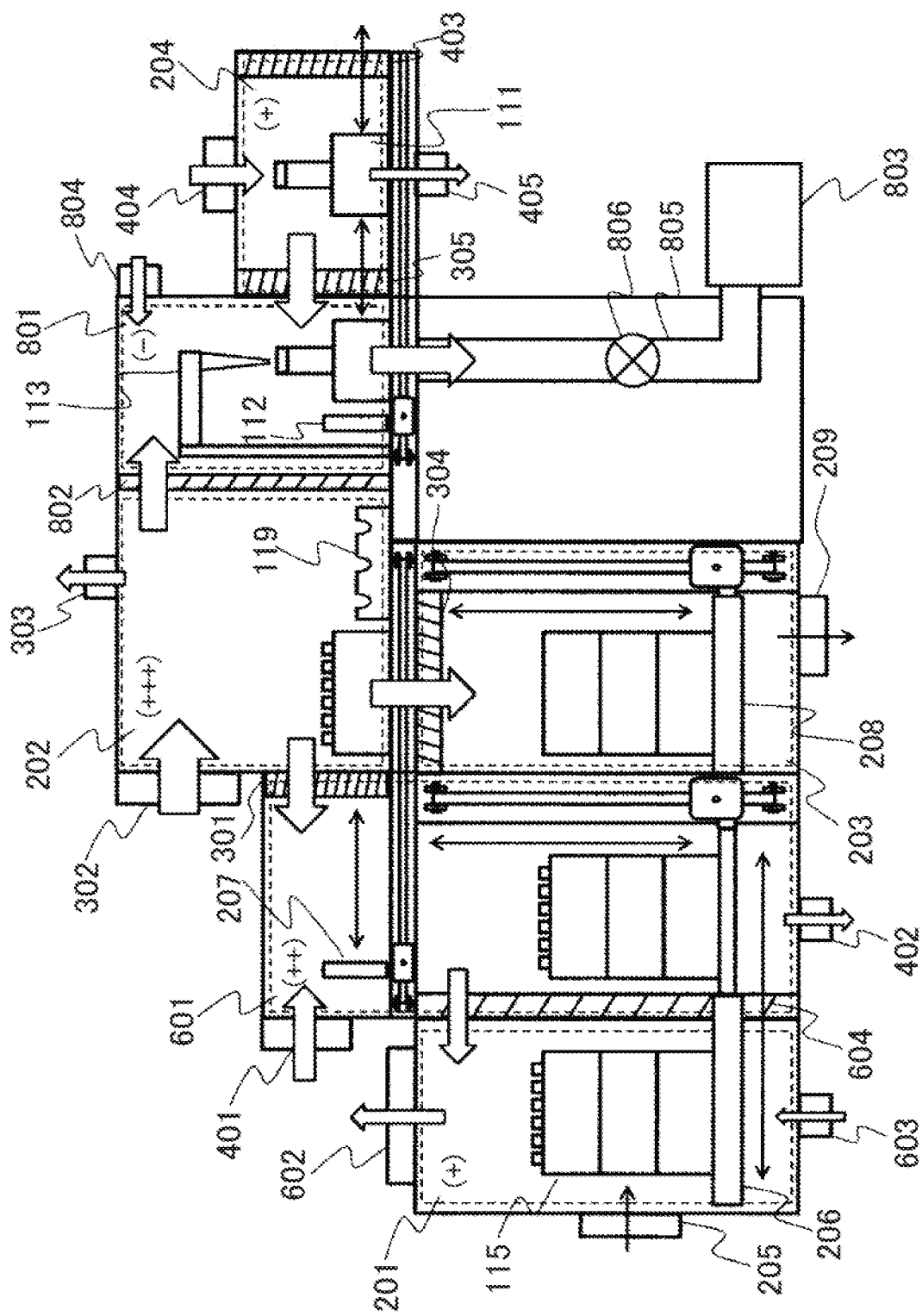

AUTOMATIC ANALYSIS DEVICE

TECHNICAL FIELD

The present invention relates to an automatic analysis device which automatically analyzes existence or non-existence of a specific component included in a biological sample such as blood serum or urine and the amount of a component.

BACKGROUND ART

An automatic analysis device contributes to quick, efficient clinical test tasks by automating part of the specimen test procedure.

As a method which measures a trace component in a biological sample by an automatic analysis device, for example, the PCR (Polymerase Chain Reaction) method which uses genetic amplification reaction is known.

For example, in the PCR method, a purified sample containing a target nucleic acid, and a reagent containing a primer nucleic acid complementary to a nucleic acid amplification area, nucleic acid extension enzyme required for nucleic acid amplification, and substrate are dispensed into a reaction container and the target nucleic acid is amplified by repeating the temperature conditions for heat denaturation of the target nucleic acid, annealing of the primer nucleic acid to the target nucleic acid and elongation reaction of the primer nucleic acid, and then a fluorescence which depends on the amount of amplified nucleic acid is detected. In this PCR method, detection can be made on the order of fmol/L or less.

In order to achieve higher sensitivity in detection using this kind of automatic analysis device, it is important to prevent the mixing of dust and the like in a reaction part in which the sample and the reagent react. The reason is that dust may contain traces of nucleic acid and nucleolytic enzyme, metal powder, metal ions and the like and there have been cases that such traces of nucleic acid are involved in reaction. Therefore, by reducing penetration of dust included in the air into the reaction part, mixing of nucleic acids other than the target nucleic acid and the influence on the sample and the enzyme can be reduced so that detection sensitivity can be improved.

As a device with a mechanism for preventing the dust from penetrating into the device, Patent Literature 1 discloses a device "with an airflow layer forming part which forms an airflow layer for preventing penetration of dust". Furthermore, as a device with a mechanism for preventing the adhesion of the dust to the pipette tip used in dispensing a sample, Patent Literature 2 discloses a device "provided with an electrostatic eliminator for removing the static electricity charged on the pipette tip".

CITATION LIST

Patent Literature

Patent Literature 1: Japanese Unexamined Patent Application Publication No. 2011-127916
Patent Literature 2: Japanese Unexamined Patent Application Publication No. 2009-30987

SUMMARY OF INVENTION

Technical Problem

When the airflow layer forming part described in Patent Literature 1 is used, the airflow layer forming part must be large to enable an airflow layer to block off the wide area inside the device. Also, Patent Literature 2 is vulnerable to dust penetration into the air taken into the device and may cause dust to enter the reaction part.

An object of the present invention is to realize the development of an automatic analysis device which can make detection with higher sensitivity, by reducing dust penetration into a reaction part in which a sample and a reagent react.

Solution to Problem

In order to solve the above problem, the present invention has the following structure.

An automatic analysis device includes: a first area with an openable/closable door in a portion thereof, in which a consumable item or sample to be used for analysis can be supplied from outside the device with the door open; a reaction area located adjacent to the first area, in which reaction using the sample is performed; a first opening/closing means for separating the first area and the reaction area in an openable/closable manner; a first air supply means or exhaust means for making the reaction area have a higher pressure than the first area; and a control means for controlling drive of the air supply means or exhaust means according to an open/closed state of the first opening/closing means.

Advantageous Effects of Invention

According to the present invention, development of an automatic analysis device which can make detection with higher sensitivity can be realized by suppressing dust penetration into a specific block inside the device or into the device.

BRIEF DESCRIPTION OF DRAWINGS

FIG. 8 is a schematic structural diagram of an automatic molecule analysis device according to a sixth embodiment of the present invention.

DESCRIPTION OF EMBODIMENTS

Next, embodiments of the present invention will be described in detail. The embodiments of the present invention are mainly intended for gene analysis devices, but the present invention can be applied to automatic analysis devices in general which make analysis with high sensitivity. For example, the invention can also be applied to biochemical automatic analysis devices, immune analysis devices, mass spectroscopes, and bacteria test devices.

Figure 1:
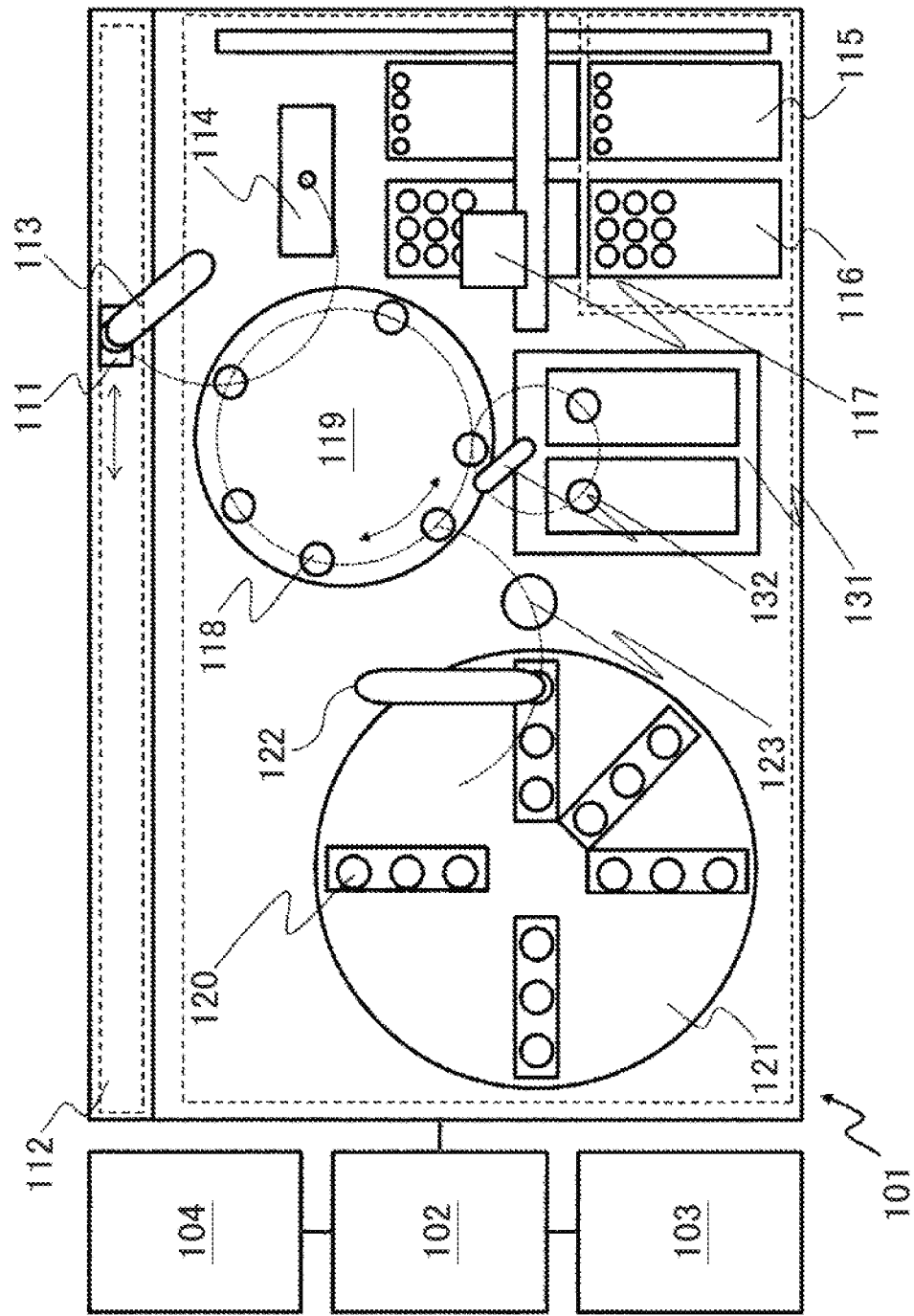
FIG. 1 is a general schematic diagram of an automatic analysis device according to an embodiment of the present invention.

First, FIG. 1 is a general schematic diagram of an automatic analysis device.

The automatic analysis device at least includes: an analysis part 101 for performing analytic operation; a control part 102 for controlling the device; an input part 103 for the user to enter information into the device; and a display part 104 for displaying information for the user. The input part 103 and the display part 104 may be the same one; one such example is a touch panel type monitor.

The analysis part 101 of the automatic analysis device as shown in the present invention includes: a transport means 112 for transporting a sample container 111 containing a sample to a sample splitting position; a sample dispensing means 113 for dispensing the sample; a dispensing tip attachment/detachment part 114 for attaching/detaching a disposable dispensing tip for the sample disposing means to/from the sample disposing means; a dispensing tip mounting rack 115 on which the dispensing tip is mounted; a reaction container mounting rack 116 on which a reaction container is mounted; a transport means 117 for transporting the dispensing tip mounting rack and the reaction container mounting rack; an incubator 119 with a plurality of openings 118 which can hold a reaction liquid in the reaction container at a fixed temperature; a reagent disk 121 for holding a reagent container 120 containing a measuring reagent; a reagent dispensing means 122 for dispensing the measuring reagent into the reaction container; a reagent dispensing means cleaning part 123 for cleaning the reagent dispensing means with water or a cleaning liquid; a detecting part 131 for making detection; and a detecting part dispensing means 132 for dispensing the reaction liquid into the detecting part.

Next, an outline of the analysis process will be described referring to FIG. 1.

In this structure, the sample container and the dispensing tip, and the reaction container are transported while they are mounted on the racks. Prior to analysis, the reaction container is set in the holding part 118 on the incubator 119 from the reaction container mounting rack 116. Prior to splitting the sample, the sample dispensing means 113 accesses the dispensing tip attachment/detachment part 114 and attaches a dispensing tip to the pointy end. The sample is sucked from the sample container 111 through the dispensing tip and dispensed into the reaction container on the incubator 119. When sample dispensing from one sample container 111 is finished, the dispensing tip is discarded into the dispensing tip attachment/detachment part 114. The reagent dispensing means 122 sucks the measuring reagent from the reagent container 120 on the reagent disk 121 and discharges it into the same reaction container. In order to prevent contamination, the reagent dispensing means is cleaned in the reagent dispensing means cleaning part 123 after dispensing. After that, incubation is performed in the incubator 119 for a given period of time. The reaction liquid in the reaction container after the end of incubation is sucked by the detecting part dispensing means 132 and transported to the detecting part 131. In the detecting part, the detected analysis result is displayed on the display part 103. The used reaction container is removed from the incubator 119.

Figure 2:
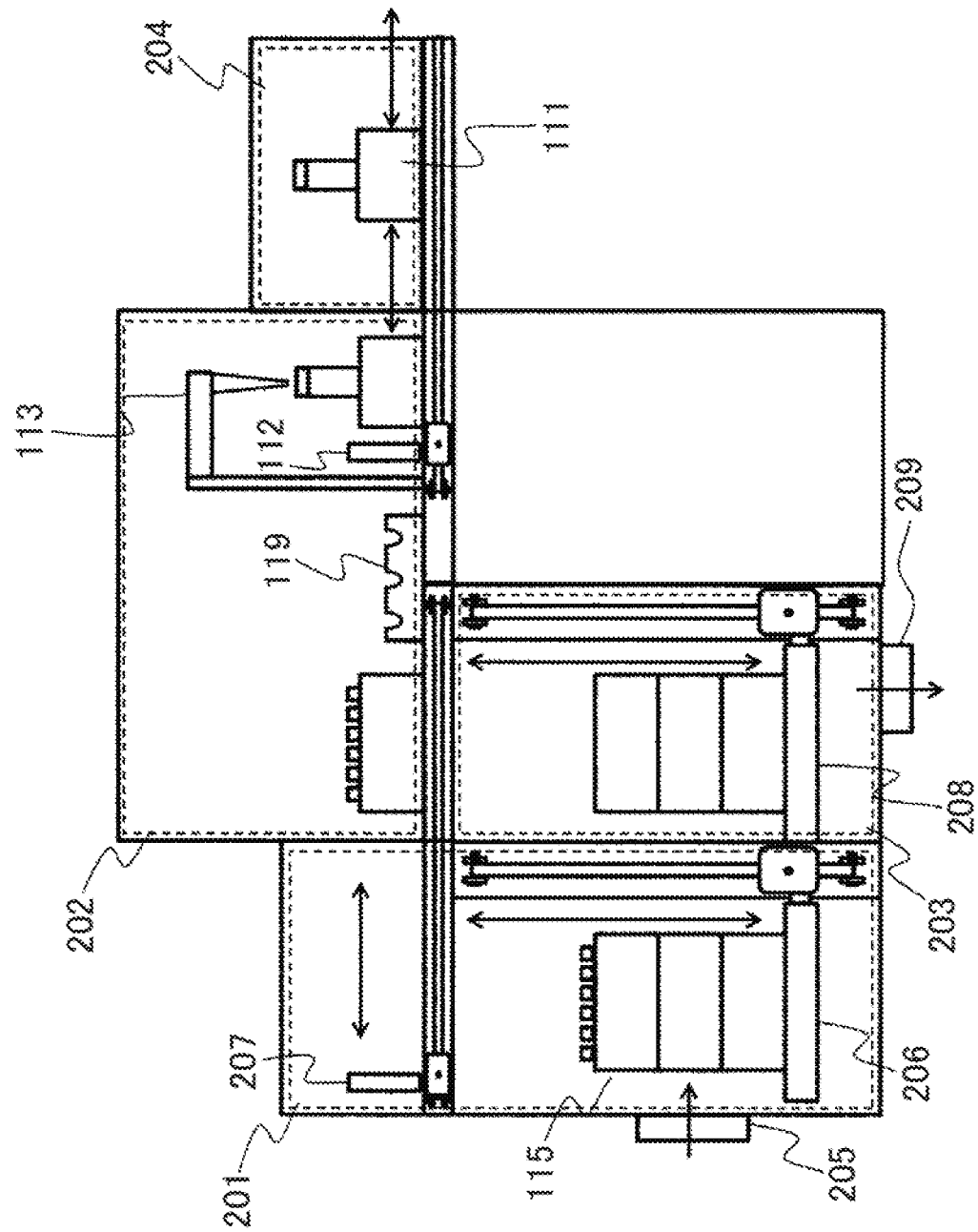
FIG. 2 is a right side view which schematically shows the structure of the conventional automatic analysis device, according to an embodiment of the present invention.

FIG. 2 is a sectional view which schematically shows the conventional automatic analysis device.

The device is divided into: a supply area 201 in which the user supplies a new dispensing tip mounting rack 115 into the device; a reaction area 202 in which a sample and a reagent are made to react in a reaction container on the incubator 119; a disposal area 203 for discharging the used dispensing tip mounting rack 115 to outside the device; and a sample reception/discharge area 204 for moving the sample container 111 into or out of the automatic analysis device. Each area is indicated by dotted lines. The supply area 201 includes a door 205 for supplying the dispensing tip mounting rack to the supply area and transport means 206 and 207 for transporting the dispensing tip mounting rack vertically and horizontally in the supply area. The disposal area 203 includes a transport means 208 for transporting the used dispensing tip mounting rack vertically.

Although in this embodiment the dispensing tip mounting rack 115 is shown as an example of a "consumable item" in the present invention, the present invention can be applied to consumable items in general which the user supplies or discharges for the automatic analysis device. The present invention covers other consumable items such as a disposable reaction container, a child sample container for subdividing and storing a sample, a calibrator and accuracy control sample to be refrigerated and stored in the analysis device, and a reagent bottle to be used for analysis or cleaning.

In FIG. 2, after the dispensing tip mounting rack 115 is supplied through the door 205 into the supply area 201 by the user, it is transported from the supply area 201 to the reaction area 202 by the transport means 206 and 207. Then, after it is consumed for analysis, it is transported from the reaction area 202 to the disposal area 203 by the transport means 208 and discharged through a door 209 by the user. In addition, the sample container 111 is transported through the sample reception/discharge area 204 to the reaction area 202 by a transport means 112 and a sample is collected for analysis by the dispensing means 113, and then discharged through the sample reception/discharge area 204.

In the conventional device structure, at the time when the user opens the door 205 or the door 209, an external air containing dust may flow into the device and enter the analysis area 202.

First Embodiment

Figure 3:
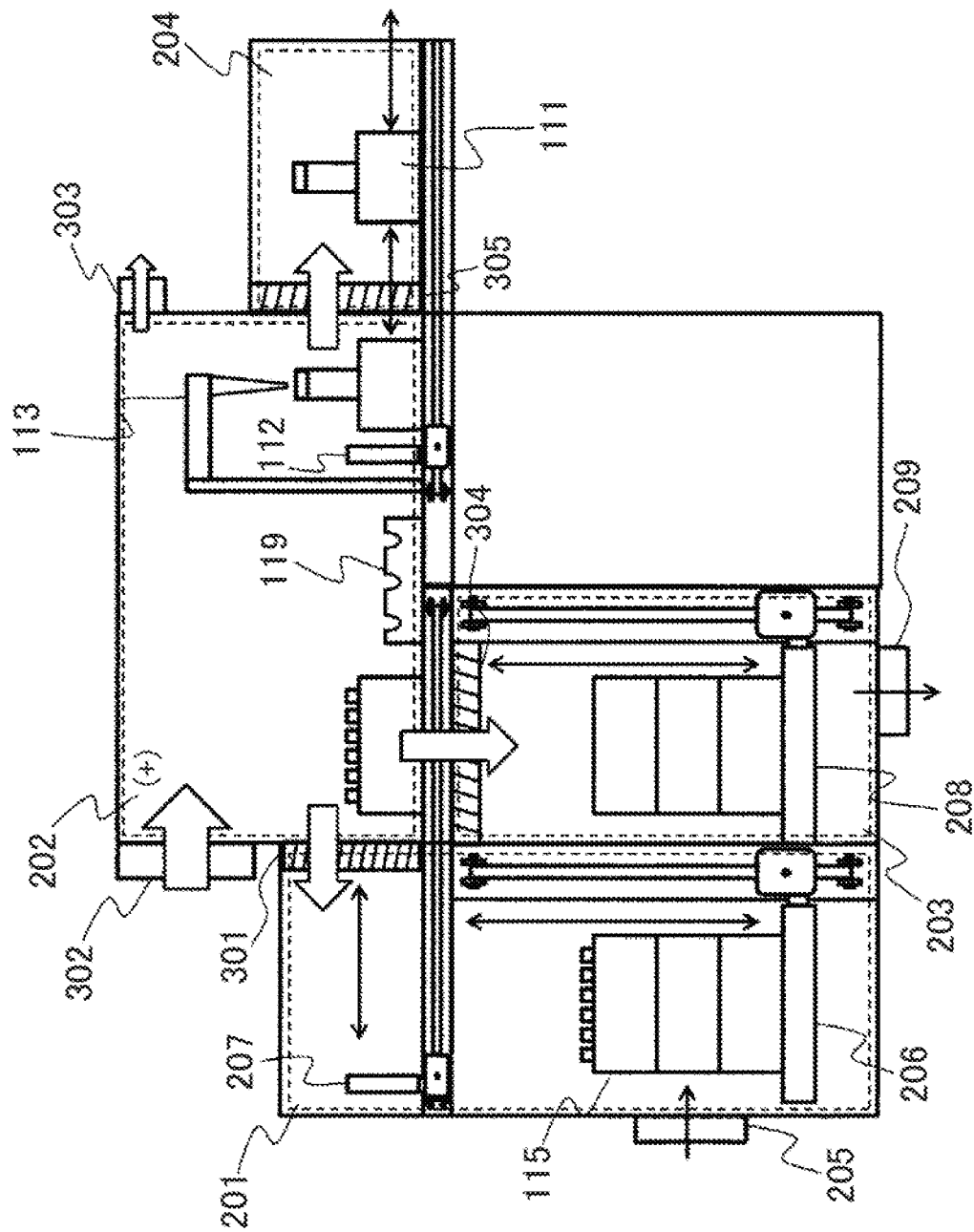
FIG. 3 is a schematic structural diagram of an automatic analysis device according to a first embodiment of the present invention.

FIG. 3 is a schematic structural diagram of an automatic analysis device according to the first embodiment of the present invention.

This embodiment is intended to prevent air which may contain dust, from flowing into the analysis area 202. For this purpose, in addition to the conventional device structure shown in FIG. 2, the device includes: an opening/closing means 301 which separates the supply area 201 and the reaction area 202; an air supply means 302 and an exhaust means 303 which perform air supply/exhaust operation to make the pressure in the reaction area 202 positive; an opening/closing means 304 which separates the reaction area 202 and the disposal area 203; and an opening/closing means 305 which separates the reaction area 202 and the sample reception/discharge area 204. An example of an opening/closing means is a shutter whose opening and closing can be controlled by the analysis device. An example of air supply/exhaust means is a fan whose operation can be controlled by the analysis device.

While the opening/closing means 301 is held open in order to transport the dispensing tip mounting rack 115 from the supply area 201 to the reaction area 202, the air supply means 302 is activated to make the pressure in the reaction part 202 positive to let the air flow from the reaction area 202 to the supply area 201. When movement of the dispensing tip mounting rack 115 is completed, the opening/closing means 301 is closed and drive of the air suction means 302 is stopped. Consequently, even if an external air enters the supply area 201 through the door 205, the external air is prevented from flowing into the reaction area 202.

When all the dispensing tips on the dispensing tip mounting rack 115 positioned in the analysis area 202 are consumed for analysis, the opening/closing means 304 is opened and the dispensing tip mounting rack 115 is transported from the analysis area 202 to the disposal area 203. While the opening/closing means 304 is open, the air supply means 302 is activated to let the air flow from the reaction area 202 to the disposal area 203. When transportation of the dispensing tip mounting rack 115 to the disposal area 203 is completed, the opening/closing means 304 is closed and the air suction means 302 is stopped. After the opening/closing means 304 is closed, the user opens the door 209 and discharges the used dispensing tip mounting rack from the device. This can prevent air from flowing into the analysis area 202 even if an external air enters the disposal area 203 through the door 209.

When disposing the sample in the sample container 111 into the reaction container, the opening/closing means 305 is opened and the target sample container 111 is transported from the sample reception/discharge area 204 to the reaction area 202. While the opening/closing means 305 is open, the air supply means 302 is activated to generate an airflow which runs from the reaction area 202 to the sample reception/discharge area 204. Once the sample container 111 is positioned in the reaction area 202, the opening/closing means 305 is closed and the air suction means 302 is stopped. This prevents an airflow containing dust from flowing from the sample reception/discharge area 204 into the reaction area 202.

When sample collection by the sample dispensing means 113 is completed, again the opening/closing means 305 is opened and the sample container 111 is returned to the sample reception/discharge area 204. While the opening/closing means 305 is open, the air supply means 302 is activated to generate an airflow which runs from the reaction area 202 to the sample reception/discharge area 204. When transportation of the target sample container 111 to the sample reception/discharge area 204 is completed, the opening/closing means 305 is closed and the air suction means 302 is stopped. The sample container 111 is discharged out of the device after the opening/closing means 305 is closed. This prevents an external air from entering the inside of the reaction area 202.

As mentioned above, by making the reaction area 202 have a positive pressure or making the reaction area have a higher pressure than the surrounding area at least while the opening/closing means is open, dust penetration into the reaction area can be prevented. In FIG. 3, the positive pressure level of the reaction area is expressed by the degree of pressure difference, in which "+" represents that the pressure is slightly higher than the atmospheric pressure. The opening/closing means is opened according to the transportation operation for the dispensing tip mounting rack and the sample container. In addition, for power saving, preferably the air supply/exhaust means should be activated according to the open/closed state of the open/close door or the opening/closing means. In FIG. 3, if a sensor for monitoring the opening/closing motion of the open/close door or the opening/closing means and a control system for controlling operation of the air supply/exhaust means according to a monitoring signal from the sensor are installed, a monitoring signal is sent from the sensor at the same time when opening or closing motion is performed, so that the air supply/exhaust means can be activated. Alternatively, in FIG. 3, by installing a sensor for monitoring transportation operation for a consumable item and a sample container and the above control system, dust penetration into the reaction area can be prevented with higher reliability. In this case, prior to opening/closing the open/close door or the opening/closing means, a monitoring signal is sent from the sensor so that when opening or closing of the open/close door or the opening/closing means is performed, the air supply/exhaust means can be activated.

Furthermore, preferably the air to be supplied into the device should be a clean air from which dust has been trapped through a filter attached to the air supply means. If an ion blower is used as the air supply means, dust can be removed while electrified substances are neutralized. In order to produce a pressure difference between the outside of the device and the inside of an area, preferably the value of pressure inside the area should be set according to the measured value of a pressure gauge installed outside the device. The pressure value inside the area can be set by adjusting the air volume balance between the air supply means and exhaust means which are installed.

In this embodiment of the invention, the dispensing tip mounting rack 115 is shown as an example of a "consumable item" in the present invention, but the present invention can be applied to consumable items in general which the user supplies or discharges for the automatic analysis device. The present invention covers other consumable items such as a disposable reaction container, a child sample container for subdividing and storing the sample in the analysis device, a calibrator and accuracy control sample to be refrigerated and stored in the analysis device, and a reagent bottle to be used for analysis or cleaning.

Second Embodiment

Figure 4:
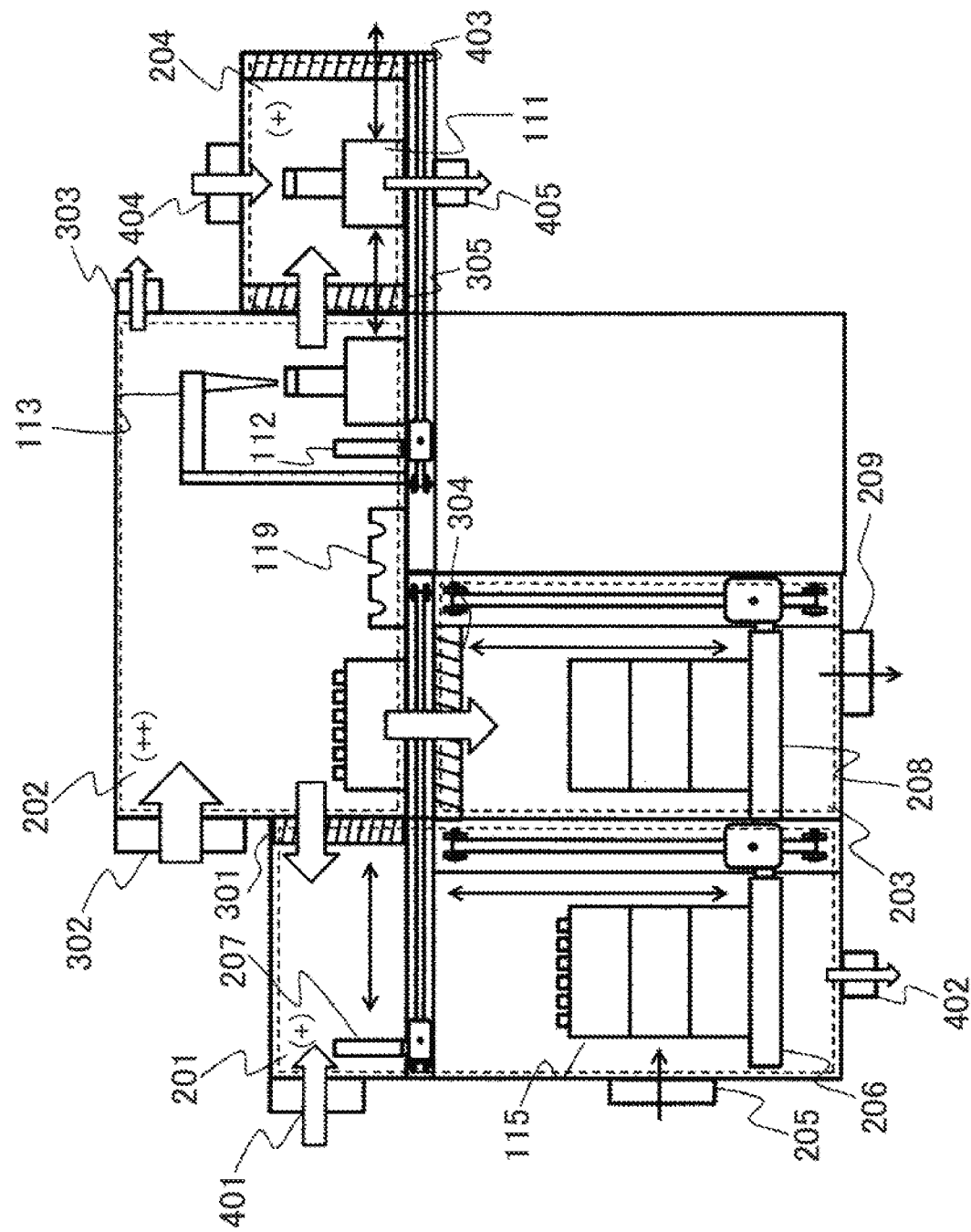
FIG. 4 is a schematic structural diagram of an automatic analysis device according to a second embodiment of the present invention.

FIG. 4 is a schematic structural diagram of an automatic analysis device according to the second embodiment of the present invention.

In addition to the first embodiment, this embodiment has a further object to prevent dust from entering the supply area 201 and the sample reception/discharge area 204. For this purpose, in addition to the device structure shown in FIG. 3, the device according to the second embodiment includes: an air supply means 401 and an exhaust means 402 which perform air supply/exhaust operation in order to make the pressure in the supply area 201 positive; an opening/closing means 403 which separates the external air and the sample reception/discharge area 204; and an air supply means 404 and an exhaust means 405 which perform air supply/exhaust operation to make the pressure in the sample reception/discharge area 204 positive.

In FIG. 4, while the user holds the door 205 open in order to supply the dispensing tip mounting rack 115, the air supply means 401 is activated to prevent air from flowing from the door 205 into the supply area 201. The operation after the door 205 is closed is the same as in the first embodiment.

In FIG. 4, the sample container 111 is supplied into the sample reception/discharge area 204 when the user opens the opening/closing means 403. While the opening/closing means 403 is open, the air supply means 404 is activated to let the air flow from inside the sample reception/discharge area 204 to the outside. The operation after closing of the opening/closing means 403 and transportation of the sample container 111 to the reaction area 202 until its return to the sample reception/discharge area 204 is the same as in the first embodiment. After that, when the sample container 111 for which processing is finished is discharged from the sample reception/discharge area 204, while the opening/closing means 403 is open, the air supply means 404 is again activated to make the sample reception/discharge area 204 have a positive pressure and thereby prevent inflow of an external air.

Since not only the block including the reaction area in the first embodiment but also the supply area and the sample reception/discharge area are made to have a positive pressure, penetration of dust can also be prevented in blocks in the device other than the reaction area. In this embodiment, the positive pressure level is expressed by the degree of pressure difference as follows: "++" for the reaction area 202 represents high positive pressure and "+" for the supply area 201 and the sample reception/discharge area 204 represents slightly higher pressure than the atmospheric pressure.

Third Embodiment

Figure 5:
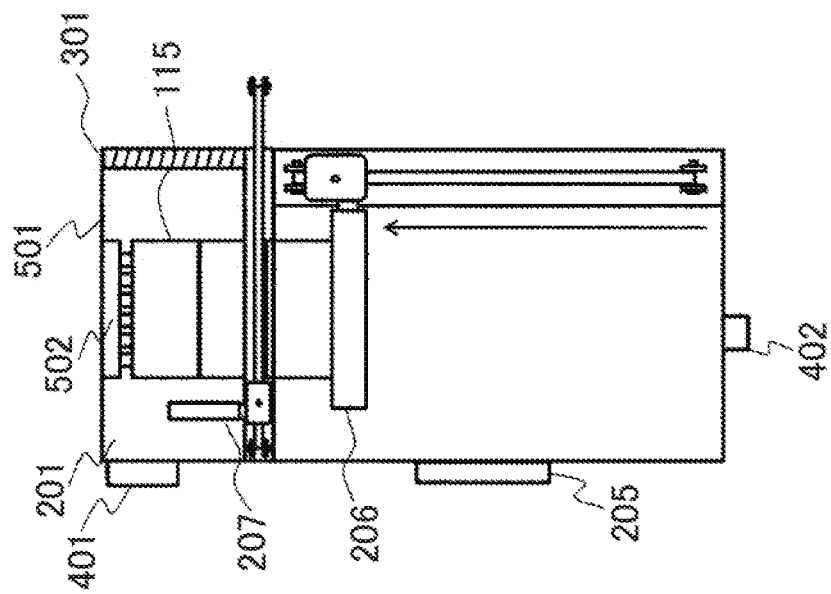
FIG. 5 is a schematic structural diagram of a dispensing tip mounting rack according to a third embodiment of the present invention.

FIG. 5 is a structural diagram which shows an embodiment which includes a cover to prevent adhesion of dust to the dispensing tip mounting rack waiting in the supply area 201.

In addition to the device structure shown in the first embodiment, this embodiment includes a cushion material 502 in an area where the lower surface of a device cover 501 in the supply area 201 is in contact with the dispensing tip. When the uppermost dispensing tip mounting rack 115 in the supply area 201 is expected not to be used in analysis for a while, usually the remaining dispensing tip mounting rack 115 is moved down by transport means 206 and made to wait until the next supply time. In this embodiment, as an additional measure to prevent dust adhesion to a waiting dispensing tip mounting rack, the remaining dispensing tip mounting rack 115 is not moved down but moved up by the transport means 206 until it comes into contact with the cushion material 502 provided on the device cover 501. Then, the dispensing tip mounting rack 115 is made to wait until the next supply time with the upper surface of the dispensing tip mounting rack 115 covered by the cushion material 502.

Although in this embodiment the cushion material 502 is used for covering, instead the upper surface of the rack may be covered directly by the device cover 501.

Fourth Embodiment

In the fourth embodiment, alarm control based on the amount of suspended dust particles is described below referring to FIG. 6.

An instrument for measuring the amount of suspended dust particles is provided in the supply area 201 so that according to the measured amount of suspended dust particles an alarm can be displayed on a screen to notify that dust may adhere to the dispensing tip mounting rack. An example of the instrument for measuring the amount of suspended dust particles is a particle counter.

Figure 6:
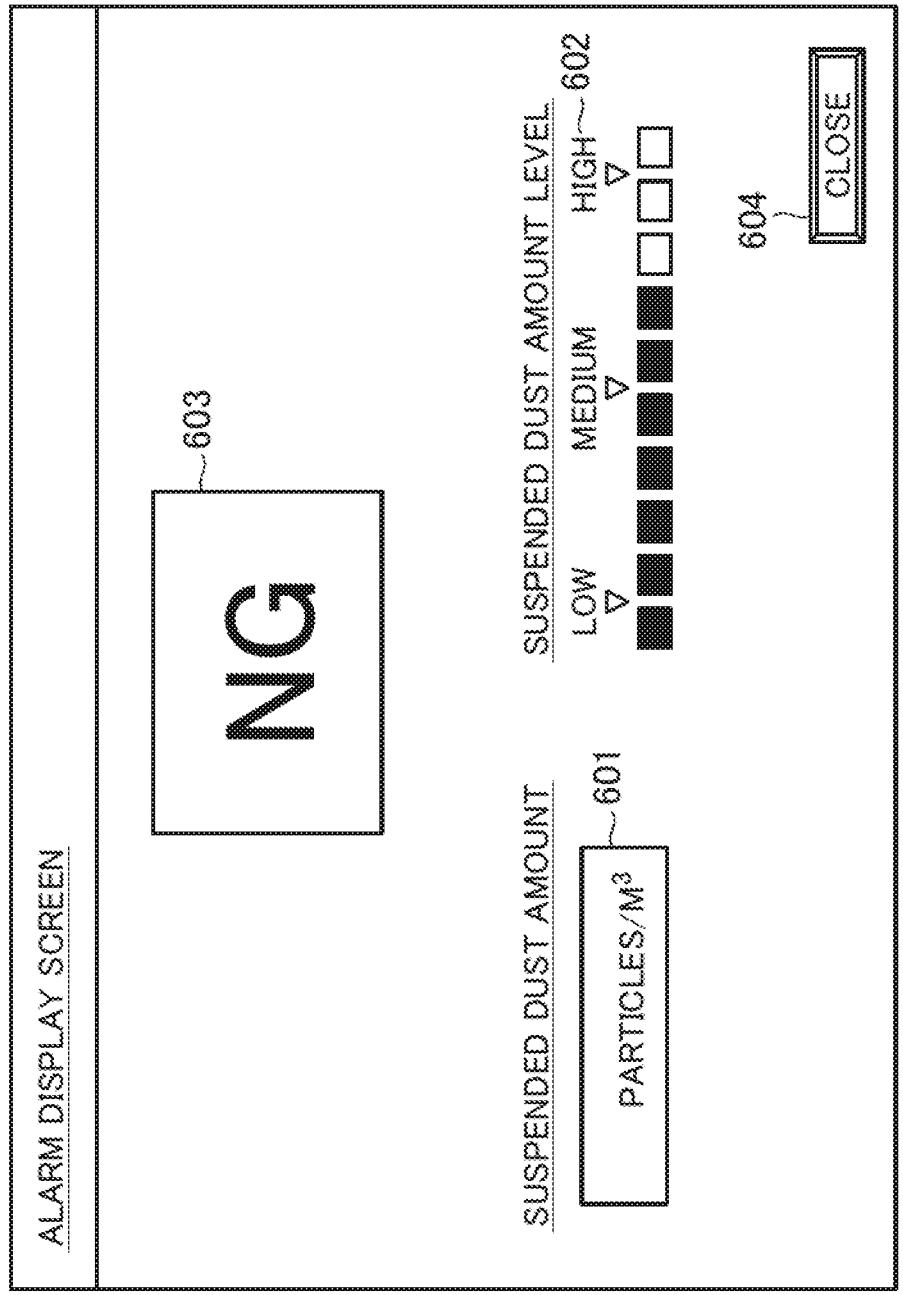
FIG. 6 is a diagram which shows an example of an alarm display screen according to a fourth embodiment of the present invention.

FIG. 6 shows an example of the screen which displays an alarm according to the measured amount of suspended dust in the automatic analysis device to which the present invention is applied. This screen includes: a suspended dust amount display part 601 which shows the value of the amount of suspended dust as measured by the measuring instrument; a suspended dust amount level display part 602 which indicates the level of the amount of suspended dust; an alarm display part 603 which shows the possibility of dust adhesion to the dispensing tip mounting rack which is determined from the suspended dust amount level; and a hide button 604 which hides this screen. The measured amount of suspended dust is displayed in the suspended dust amount display part 601 and the level of the amount of suspended dust is displayed in the suspended dust amount level display part 602. Depending on the level, an alarm to notify that dust may adhere to the dispensing tip mounting rack is displayed in the alarm display part 603.

If an alarm is displayed, the amount of suspended dust is decreased to a certain level by the air supply means 401 and exhaust means 402. Alternatively, it is possible to make a setting so as to discard the uppermost dispensing tip mounting rack to which dust may adhere or disallow the start of analysis.

The above setting can also be made for each inspection item. If an alarm is displayed, for example, for an inspection item which does not require high sensitivity, a setting is made to permit the start of analysis using the dispensing tip mounting rack as it is. On the other hand, for an inspection item which requires high sensitivity, a setting is made to permit the start of analysis after the amount of suspended dust is decreased to a certain level by the air supply means 401 and exhaust means 402. Alternatively, for an inspection item which requires high sensitivity, a setting may be made to control the transport means 206 and 207 so as to discard the uppermost dispensing tip mounting rack and use a dispensing tip mounted on the next dispensing tip mounting rack. Alternatively, a setting may be made so that if adhesion of dust is likely to occur, analysis and operation are not performed for such an inspection item that requires high sensitivity.

The measuring instrument may be located in an area other than the supply area 201. For example, it may be located in the sample reception/discharge area 204 or the analysis area 202.

Fifth Embodiment

Figure 7:
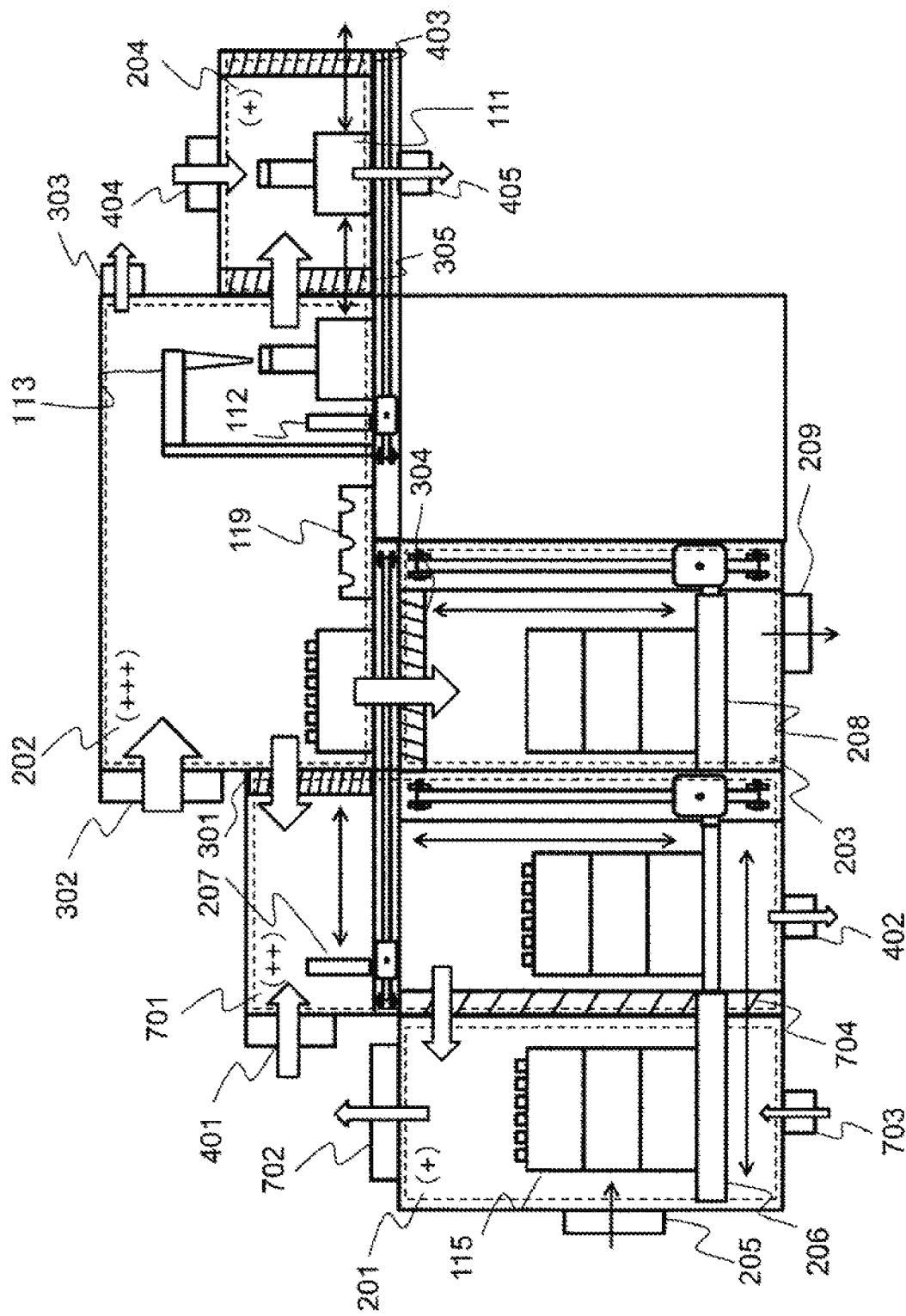
FIG. 7 is a schematic structural diagram of an automatic molecule analysis device according to a fifth embodiment of the present invention.

FIG. 7 is a schematic structural diagram of an automatic analysis device according to the third embodiment of the present invention.

This embodiment is intended so that when the dispensing tip mounting rack 115 supplied to the device has adhering dust, the dust is removed in advance. For this purpose, in addition to the device structure shown in the second embodiment, the automatic analysis device includes: a waiting area 701 between the supply area 201 and the reaction area 202, in which the supplied dispensing tip mounting rack 115 is made to wait until it is used for analysis; an exhaust means 702 and an air supply means 703 which perform exhaust/air supply operation to remove the dust adhering to the dispensing tip mounting rack 101 in the supply area 201; and an opening/closing means 704 which separates the supply area 201 and the waiting area 701.

As the dispensing tip mounting rack 115 is supplied from the door 205 into the supply area 201 and the door 205 is closed, the exhaust means 702 is activated to remove the dust adhering to the dispensing tip mounting rack 115. After a prescribed period of time, the exhaust means 702 is stopped. Then, the opening/closing means 704 is opened and a plurality of dispensing tip mounting racks 115 mounted on the transport means 206 are moved to the waiting area 701.

At this time, while the opening/closing means 704 is open, the air supply means 401 is activated to prevent air from flowing from the supply area 201 into the waiting area 701. The operation after closing of the opening/closing means 704 and transportation by the transport means 206 is the same as in the second embodiment.

As the sample container 111 is supplied into the sample reception/discharge area 204 and the opening/closing means 403 is closed, the air supply means 404 is activated to remove the dust adhering to the sample container 111. After a prescribed period of time, the air supply means 404 is stopped. The operation for transportation to the reaction area 202 is the same as in the second embodiment.

Not only the reaction area 202, the supply area 201, and the sample reception/discharge area 204 but also the waiting area 701 are made to have a positive pressure and also the exhaust means and air supply means to remove the dust adhering to the dispensing tip mounting rack 115 and the sample container 111 are provided in the supply area 201 and the sample reception/discharge area 204. This structure can prevent dust penetration into various blocks in the device, including the reaction area, and also remove the dust adhering to the dispensing tip mounting rack and the sample container at the time of supply into the device. In FIG. 7, the positive pressure level is expressed by the degree of pressure difference as follows: "+++" for the reaction area 202 represents very high positive pressure, "++" for the waiting area 701 represents high positive pressure, and "+" for the supply area 201 and the sample reception/discharge area 204 represents slightly higher pressure than the atmospheric pressure.

Sixth Embodiment

FIG. 8 is a schematic structural diagram of an automatic analysis device according to the fifth embodiment of the present invention.

This embodiment is intended to prevent the sample in the form of mist as generated in a biohazard area from contaminating the surroundings or causing contamination. For this purpose, in addition to the device structure shown in the fourth embodiment, the automatic analysis device includes: a sample dispensing area 801; an opening/closing means 802 for separation from the reaction area 202; an exhaust means 803 and an air supply means 804 which perform exhaust/air supply operation to make the pressure in the sample dispensing area 801 negative; an exhaust flow channel 805 by the exhaust means 803; and a valve 806 installed in the exhaust flow channel 805 to control the exhaust.

In this embodiment, in addition to the operation in the fourth embodiment, the opening/closing means 802 is opened when the sample is dispended. Therefore, while the opening/closing means 802 is open and the analysis area 202 and the sample dispensing area 801 are connected, and while the opening/closing means 305 is open and the sample reception/discharge area 204 and the sample dispensing area 801 are connected, air is supplied to the analysis area 202 or the sample reception/discharge area 204 by the air supply means 302 or the air supply means 404 and at the same time, the valve 806 is opened to evacuate the sample dispensing area 801 by the exhaust means 803.

In this embodiment, the biohazard block or the like is set to have a slightly lower pressure "−" than the atmospheric pressure with the aim of preventing leakage of harmful substances into the atmospheric air. In an automatic analysis device which analyzes a biologic sample, the sample in the sample container is sucked by a sample dispensing means and discharged into a reaction container. During this discharge, the sample may be aerosolized and scattered around. In the automatic analysis device in the fourth embodiment, leakage as mentioned above can be prevented by separating a block in which sample-derived aerosols are generated, such as the sample dispensing area, by an opening/closing means and providing a filter and an exhaust means for removing aerosols and a valve for controlling the exhaust.

In this embodiment, while the opening/closing means 802 or the opening/closing means 305 is open and air is being supplied by the air supply means 302 or the air supply means 404, at the same time evacuation is performed by the exhaust means 803 so that the relation in pressure difference between blocks can be maintained. Furthermore, only when removal of aerosols is needed, the valve 806 is opened and evacuation by the exhaust means 803 is performed so as to avoid unnecessary evaporation of a sample or the like, achieve power saving, and lengthen the life of peripheral components of the exhaust means. In the exhaust flow channel 805, at least one filter for removing aerosols must be provided.

LIST OF REFERENCE SIGNS

101: analysis part, 102: control part, 103: input part, 104: display part, 111: sample container, 112: transport means, 113: sample dispensing means, 114: dispensing tip attachment/detachment part, 115: dispensing tip mounting rack, 116: reaction container mounting rack, 117: transport means, 118: sample holding part on the incubator, 119: incubator, 120: measuring reagent container, 121: reagent disk, 122: reagent dispensing means, 123: reagent dispensing means cleaning part, 131: detecting part, 132: detecting part dispensing means, 201: supply part, 202: reaction part, 203: disposal part, 204: sample reception/discharge part, 205: door, 206: transport means, 207: transport means, 208: transport means, 209: door, 301: opening/closing means, 302: air supply means, 303: exhaust means, 304: opening/closing means, 305: opening/closing means, 401: air supply means, 402: exhaust means, 403: opening/closing means, 404: air supply means, 405: exhaust means, 501: device cover, 502: cushion material, 601: suspended dust amount display part, 602: suspended dust amount level display part, 603: alarm display part, 604: hide button, 701: waiting part, 702: exhaust means, 703: air supply means, 704: opening/closing means, 801: sample dispensing part, 802: opening/closing means, 803: exhaust means, 804: air supply means, 805: exhaust flow channel, 806: valve

The invention claimed is:
1. An automatic analysis device comprising:
a first area with an openable/closable door in a portion thereof, in which a consumable item or a sample to be used for analysis can be supplied from outside the automatic analysis device with the door open;
a reaction area located adjacent to the first area in which reaction using the sample is performed;
a first opening/closing means for separating the first area and the reaction area in an openable/closable manner;
a first air supply means or an exhaust means for making the reaction area have a higher pressure than the first area; and
a control means for controlling drive of the first air supply means or the exhaust means according to an open/ closed state of the first opening/closing means.

2. The automatic analysis device according to claim 1, comprising:
a disposal area located adjacent to the reaction area to discard a used consumable item; and
a second opening/closing means for separating the reaction area and the disposal area in an openable/closable manner;
wherein the control means further controls the drive of the first air supply means or the exhaust means according to the open/closed state of the second opening/closing means.

3. The automatic analysis device according to claim 1, comprising:
a second air supply means or an exhaust means for making not only the reaction area but also the first area have a higher pressure than outside the automatic analysis device,
wherein pressure in the first area is adjusted so as to be lower than in the reaction area.

4. The automatic analysis device according to claim 3, comprising a covering material for covering an upper part of the consumable item waiting before being used for analysis.

5. The automatic analysis device according to claim 3, comprising:
a measuring instrument for measuring an amount of dust in the automatic analysis device; and
a display part for displaying an alarm to notify that dust may adhere to the consumable item, according to the measured amount of dust.

6. The automatic analysis device according to claim 5, wherein in response to determining that the amount of dust measured by the measuring instrument exceeds a predetermined amount, the control part drives the second air supply means or the exhaust means.

7. The automatic analysis device according to claim 5, wherein if the amount of dust measured by the measuring instrument exceeds a predetermined amount, the control part performs control so as to discard the consumable item to which dust may adhere.

8. The automatic analysis device according to claim 5, wherein if the amount of dust measured by the measuring instrument exceeds a predetermined amount, the control part performs control so as to disallow start of analysis.

9. The automatic analysis device according to claim 5, wherein if the amount of dust measured by the measuring instrument exceeds a predetermined amount, depending on a requested inspection item, the control part performs control so as to drive the air supply means or the exhaust means, or discard the consumable item to which dust may adhere, or disallow start of analysis.

10. The automatic analysis device according to claim 3, the first area being a consumable item supply area which receives the consumable item,
the automatic analysis device comprising:
a waiting area in which the consumable item supplied from the supply area is made to wait and supplied to the reaction area; and
a third air supply means or an exhaust means for making the waiting area have a higher pressure than outside the automatic analysis device, wherein
the control part controls the first air supply means or the exhaust means so as to make the pressure in the first area and the waiting area lower than in the reaction area.

11. The automatic analysis device according to claim 1, wherein the air supply/exhaust means is activated according to the open/closed state of an open/close door which a user opens and closes in order to supply the consumable item, or of the opening/closing means.

12. The automatic analysis device according to claim 11, comprising:
a sensor for monitoring transportation operation for the consumable item and a sample container; and
a control system for controlling operation of the air supply/exhaust means according to a monitoring signal from the sensor, wherein
prior to opening or closing the open/close door or the opening/closing means, the air supply/exhaust means is activated.

13. The automatic analysis device according to claim 1, wherein an ion blower is used as the first air supply means.

14. The automatic analysis device according to claim 1, wherein the air supply means has a filter capable of trapping dust.

15. The automatic analysis device according to claim 1, wherein an inner pressure of each area can be adjusted arbitrarily by adjusting an air volume balance by the first air supply means or the exhaust means as appropriate.

16. The automatic analysis device according to claim 1, comprising:
a sample dispensing area in which part of the sample supplied from the first area is split, wherein
the sample dispensing area is made to have a negative pressure and an exhaust means with a filter capable of trapping aerosols is provided.

* * * * *